United States Patent [19]
Johnson

[11] 3,821,129
[45] June 28, 1974

[54] METHOD AND APPARATUS FOR EXTRUSION OF THERMOPLASTICS

[75] Inventor: David E. Johnson, Macedon, N.Y.

[73] Assignee: Mobil Oil Corporation, New York, N.Y.

[22] Filed: Nov. 21, 1972

[21] Appl. No.: 308,386

Related U.S. Application Data

[62] Division of Ser. No. 162,555, July 14, 1971.

[52] U.S. Cl....... 260/2.5 E, 260/2.5 HB, 260/2.5 B, 260/33.6 UA, 260/33.8 UA, 264/53, 425/207
[51] Int. Cl. ............................................ C08f 47/10
[58] Field of Search ....... 260/2.5 E, 2.5 HB; 264/53

[56] References Cited
UNITED STATES PATENTS

| | | | |
|---|---|---|---|
| 2,669,751 | 2/1954 | McCurdy et al. | 260/2.5 E |
| 3,026,272 | 3/1962 | Rubens et al. | 260/2.5 E |
| 3,658,973 | 4/1972 | Aykanian | 260/2.5 E |

*Primary Examiner*—Wilbert J. Briggs, Sr.
*Attorney, Agent, or Firm*—A. L. Gaboriault; J. D. Tierney

[57] ABSTRACT

In a method and apparatus for the extrusion of thermoplastic resinous materials and, in particular, molten thermoplastic resin containing volatile blowing agent in admixture therewith, a seal is provided for an extruder to prevent escape or leakage therefrom of the molten thermoplastic resin-volatile blowing agent mixture.

4 Claims, 3 Drawing Figures

PATENTED JUN 28 1974 3,821,129

METHOD AND APPARATUS FOR EXTRUSION OF THERMOPLASTICS

This is a Division of application Serial No. 162,555, filed July 14, 1971.

BACKGROUND OF THE INVENTION

1. Field of the Invention

The present invention relates to the extrusion of thermoplastic resinous materials and, in particular, mixtures of thermoplastic resinous materials with a volatile foaming agent. Such mixtures are extruded to form thermoplastic foam materials. In accordance with the method and apparatus of the present invention, in an extrusion system for producing such foam materials where two extruders may be employed, the first or primary extruder for melting the resinous thermoplastic and mixing it with the volatile blowing agent and; the second extruder wherein the mixture is cooled to a temperature suitable for extrusion thereof into a foamed structure, a novel seal is provided in the area where the molten mixture from the primary extruder is introduced into the secondary or cooling extruder whereby undesirable leakage of this mixture is minimized or substantially eliminated.

2. Description of the Prior Art

In the past, in extrusion systems employing a primary and secondary extruder, as aforedescribed, for the production of thermoplastic foam materials, problems have been encountered at the point where molten resin containing a volatile blowing agent was introduced from the primary extruder into the secondary extruder. At this point, the material flowing from the primary extruder is under a relatively high pressure, i.e., on the order of from about 500 up to about 10,000 psi. Such pressures cause a portion of the molten material entering the secondary extruder to have a tendency to flow out through the rear of the secondary extruder at a point intermediate the terminus of the screw and the barrel surrounding the extrusion screw rather than advancing through the extruder to the outlet or "die-orifice" end of the secondary extruder. Attempts in the past to remedy this undesirable leakage problem centered primarily on providing elastic rings or teflon packing materials at the terminal end of the cooling extruder intermediate the rotating screw and the extruder barrel surrounding it. Such seals were found to be unsatisfactory in that after limited periods of usage the seals would fail for various reasons. For example, in the case of elastic rings, they had a tendency to take on a permanent set after limited usage which resulted in leakage at the terminus of the secondary extruder, or in the case of the teflon packing materials, due to the "cold-flow" characteristics of the teflon materials after limited periods of usage, again, leakage resulted.

BRIEF SUMMARY OF THE INVENTION

In accord with the method and apparatus of the present invention, when a mixture of molten thermoplastic resin and volatile blowing agent is fed from a primary or mixing extruder into a secondary extruder, leakage of the molten mixture through the end portion of the secondary extruder at a point intermediate the rotating extruder screw and the barrel of the secondary extruder is avoided by cooling a portion of the barrel immediately surrounding the end or shank portion of the secondary extruder screw, which cooling causes solidification of that portion of the molten material which tends to advance away from the discharge or extrusion zone of the secondary extruder whereby the frozen or solidified thermoplastic provides a seal intermediate the terminus or end portion of the extrusion screw of the secondary extruder and the surrounding barrel to minimize or substantially eliminate escape of the molten feed mixture from the end of the secondary extruder.

DESCRIPTION OF SPECIFIC EMBODIMENTS

Although the following description of the method and apparatus of the present invention is particularly directed to an extrusion system wherein two extruders, i.e., a primary extruder being fed by a secondary extruder, are employed, it will be understood that the present invention may be employed in any extrusion system wherein molten thermoplastic material is introduced into a rotating screw type extruder.

Figure 1:
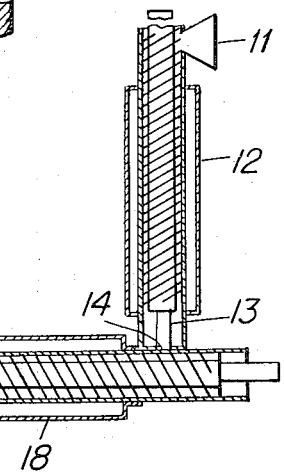
FIG. 1 is a schematic view of an extrusion system in which the method and apparatus of the present invention may be employed.

As shown in FIG. 1, illustrative of a type of extrusion system which may employ the novel method and apparatus of the present invention, solid thermoplastic material, e.g., in the form of pellets, may be introduced into the hopper 11 of primary extruder 12. Primary extruder 12 is a standard rotating screw type extruder wherein the thermoplastic resinous pellets are advanced by the rotation of the screw member and, during their advancement, are melted by the shearing action of the flights of the screw forcing the material against the interior of the barrel of primary extruder 12. Additional heating means such as a heated fluid, circulated internally of a jacket around the barrel surrounding the screw of primary extruder 12, may be employed to promote the melting of the thermoplastic resin therein. After the thermoplastic material has been melted in primary extruder 12 a volatile liquid blowing agent may be introduced into the molten resinous mixture in instances where it is desired to produce a thermoplastic foam. Such agent may be, for example, a lower alkyl hydrocarbon such as butane, pentane, isopentane and the like or in some instances freons may be employed. After introduction of the volatile blowing agent into the molten resinous material in primary extruder 12, the materials are continually mixed together in primary extruder 12 as they are advanced towards the outlet end of extruder 12 through conduit 13 and introduced into secondary or cooling extruder 15, as illustrated in FIG. 1. After introduction of the mixture of molten resin and volatile blowing agent into extruder 15, the molten mixture is advanced by virtue of rotation of the rotating screw 19 in extruder 15 to the outlet end of extruder 15. The outlet end of extruder 15 may be equipped with an annular orifice die member 16. The molten resin-blowing agent mixture is extruded through annular die member 16 to form a foam thermoplastic tube 17, which is subsequently expanded utilizing conventional techniques, as shown in cross section in FIG. 1, to the desired diameter. During the passage of the molten mixture through extruder 15, it is continually being cooled to a suitable extrusion temperature by virtue of a coolant 23 circulated internally through the jacket of surrounding barrel member 18 of extruder 15.

Figure 2:
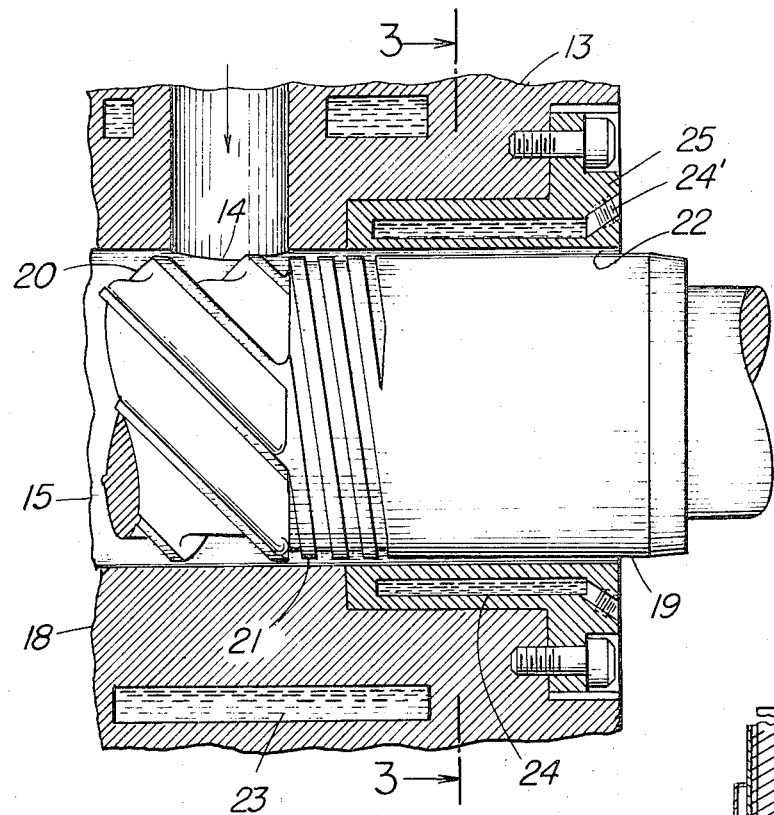
FIG. 2 is an enlarged fragmentary cross-section of a portion of the extrusion system illustrated in FIG. 1.

It will be noted, as more clearly illustrated in FIG. 2, that as the molten mixture of thermoplastic resin and volatile blowing agent is passed through conduit 13 from primary extruder 12 into secondary extruder 15 there is a gap 22 at the terminus or end of the extruder 15 immediately adjacent the area of entry 14 of the molten mixture. Since the molten thermoplastic mixture is under a relatively high pressure at this point, there is a tendency of the molten mixture to flow back towards the shank of extrusion screw 19 into the area 22 intermediate the end of the extrusion screw 19 and surrounding barrel member 18. The gap in area 22 is approximately 30 mils, this being the requisite spacing of screw 19 from the inner surface of the barrel of extruder 15. This causes undesirable leakage of a portion of the molten material through gap 22 rather than, as in the case of the major portion of the molten mixture introduced at 14, being advanced towards the extrusion end of extruder 15 to annular die member 16.

Figure 3:
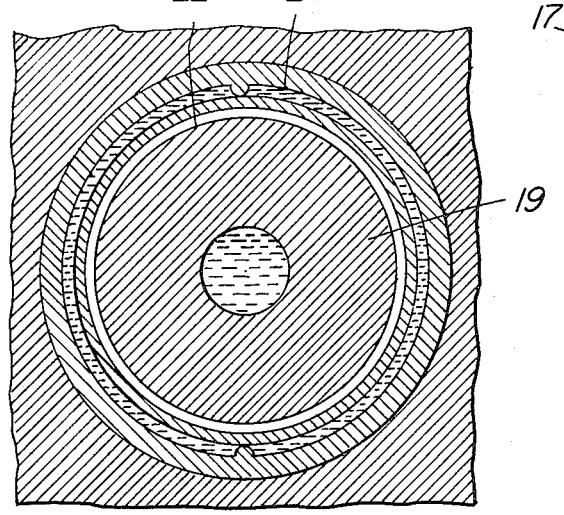
FIG. 3 is a cross-sectional view taken on line 3—3 of FIG. 2.

As shown in FIG. 2 and FIG. 3, in accord with the method and apparatus of the present invention this undesirable leakage of material through gap 22 is eliminated or substantially reduced by providing that portion of the barrel of extruder 18 which surrounds the terminal, shank-end or unflighted area of extrusion screw 19 with a cooling member 25 through which there is circulated a cooling fluid, such as water for example, in the hollow annular area 24, whereby the portion of molten material in zone 22 is positively cooled by conduction. Such cooling of the shank portion of extruder screw 19, as well as cooling of the interior surface of member 25, results in the molten thermoplastic mass which enters zone 22 to solidify. This solidification has been found to block zone 22 even under the extremes of pressure hereinabove discussed so that leakage through zone 22 of the molten mixture is either completely eliminated or substantially reduced, thereby forming a very effective seal. The seal that is formed is a "dynamic" seal in that the frozen thermoplastic which effects sealing is continuously withdrawn from zone 22 by virtue of return flight members 21 on extruder screw 19 in zone 22, and, as the solidified material is withdrawn, fresh molten thermoplastic replaces it in zone 22 and is frozen by virtue of the coolant circulated through zone 24. The solidified thermoplastic withdrawn from gap 22 is continuously fed by return flights 21 into the main extrusion zone of extruder 15 and carried by forwarding flights 20 to the outlet or extrusion zone of extruder 15 and is expressed through annular die member 16.

As shown in FIGS. 2 and 3 the screw member 19 in the area of the return flights 21 and the unflighted shank portion of the screw is characterized by having a hollow annular core 26. Cooling fluid, such as water for example, may be circulated through core 26 to further assist solidification of molten material entering gap 22.

It will be noted that by virtue of the above-described method and apparatus, rather than using extraneous materials such as gasketing and the like to effect seals in such extrusion systems as had been ineffectively employed by the prior art, by freezing the molten feed material in the end portion of the secondary extruder, continually withdrawing the frozen material back into the mainstream of molten material and replacing the withdrawn material with new molten material which is subsequently solidified, the process continuing to cycle in such fashion throughout the entire extrusion operation, an extremely simple, inexpensive and effective method is achieved whereby undesirable leakage of material being extruded is now completely eliminated or substantially reduced.

The following is a specific example which employs the method and apparatus of the present invention. This example is given by way of illustration only and is in no way intended as limitative of the scope of the invention.

Example 1

Polystyrene pellets of approximately 1/16 inch diameter (supplied by the Foster Grant Co. and identified as F.G.—50S) were admixed in a drum tumbler with a cell size control additive mixture comprising about 0.86 percent by weight of a mixture of sodium bicarbonate and citric acid. The cell size control additive mixture was utilized in the extrusion process to control the cell size of the individual cells in the final polystyrene foam product. The mixture of the polystyrene pellets and cell size control additive mixture was discharged into feed hopper 11 of extruder 12 illustrated in the extrusion system of FIG. 1. The charge progressed from the feed zone of extruder 12 to a heat plasticizing zone which was maintained at a temperature of from about 400° to about 450°F. The resulting molten mass was then progressed by the continuous rotation of the forwarding screw of extruder 12 to a blowing agent injection zone (not shown) in extruder 12 where approximately 5 percent by weight (based on the total weight of polystyrene) of liquid isopentane was pumped into the molten resin at a pressure of approximately 2,000 pounds per square inch, with the temperature in the injection zone maintained at approximately 400° to 450°F. The pentane-molten polymer mixture was then continuously forwarded to the mixing zone or terminal portion of primary extruder 12, the temperature being maintained at a range of from about 400° to about 450°F. The molten mixture was subsequently forwarded through conduit 13 into secondary extruder 15 where the mixture was cooled to a temperature of about 250° to about 265°F. prior to extrusion of the molten mixture through tubular die 16, whereupon tube 17 of foam polystyrene was formed. This tube was subsequently split into a sheet of foamed material, which material was flexible and ideally suited for packaging container applications.

As the molten mixture from extruder 12 was fed through conduit 13 at entry point 14 of secondary extruder 15 the pressure of the molten mixture in this area was approximately 2,500 psi. At the rear of extruder 15, water at a temperature of 70°F. was fed through entry port 24' into the annular orifice 24 of cooling member 25. The water continuously circulating in annular orifice 24 caused solidification of that portion of the molten polymerblowing agent mixture which, upon introduction through conduit 13 into extruder 15, flowed into gap 22 intermediate the unflighted shank portion of screw 19 and cooling member 25 surrounding the unflighted portion of screw 19. This solidified molten material was continuously withdrawn from gap 22 by return flights 21 and reintroduced into the mainstream of the molten polymer in extruder 15 and forwarded by the advancing flights 20 of screw 19 to annular die orifice 16. As the solidified material was being removed from zone 22, additional molten material replaced it, which was subsequently solidified. This cycle was continuous throughout the entire extrusion operation. It was found that the solidified molten material in zone 22 prevented substantial escape or leakage of the molten polymer-blowing agent mixture from the end of extruder 15 through zone 22. It was found that the seal described in Example 1, with the extrusion system in operation continuously for up to a period of about 12 months, showed no signs of failure.

Example 2

Utilizing the same apparatus, feed mixture, additives, temperatures and pressures described in foregoing Example 1, a molten mixture of polymer and blowing agent was introduced into extruder 15. No cooling member 25 was employed around the unflighted shank of extruder screw 19 but in its place a teflon seal was positioned in gap 22 between the screw and inner surface of barrel 18. It was found that after only 2 weeks of operation, copious amounts of the molten polymer-isopentane blowing agent mixture began to escape and exude through gap 22 and through the end of extruder 15.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. In a process for producing a thermoplastic resin foam by feeding a mixture of a molten thermoplastic resin and a volatile blowing agent into an elongated extrusion zone adjacent an end portion of said zone opposite to the discharge end of said extrusion zone, said zone comprising an elongated rotating screw disposed inside an elongated barrel whereby said mixture fed into said extrusion zone is advanced by said screw towards the discharge end of said extrusion zone, the improvement which comprises solidifying that portion of said mixture which tends to advance from said feed zone in between said barrel and said screw in a direction opposite to the discharge end whereby to provide a seal to minimize escape of said mixture from the end of said barrel opposite the discharge end of said extrusion zone.

2. A process in accordance with claim 1 wherein said thermoplastic resin is polystyrene.

3. A process in accordance with claim 1 wherein said volatile blowing agent comprises a member selected from the class consisting of lower alkyl hydrocarbons and a freon.

4. A process in accordance with claim 1 wherein said volatile blowing agent comprises isopentane.

* * * * *